M. BROWN.
MOLDED SOLE.
APPLICATION FILED NOV. 2, 1917.

1,432,961.

Patented Oct. 24, 1922.
2 SHEETS—SHEET 1.

Inventor:
Max Brown
by Clyde L Rogers
his Att'y.

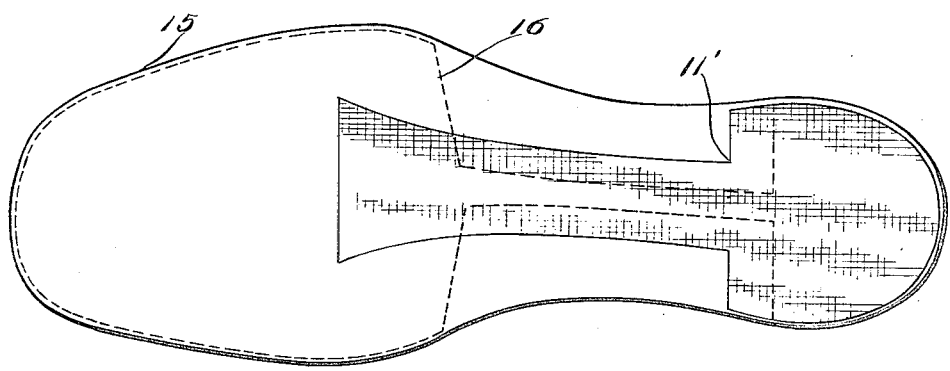
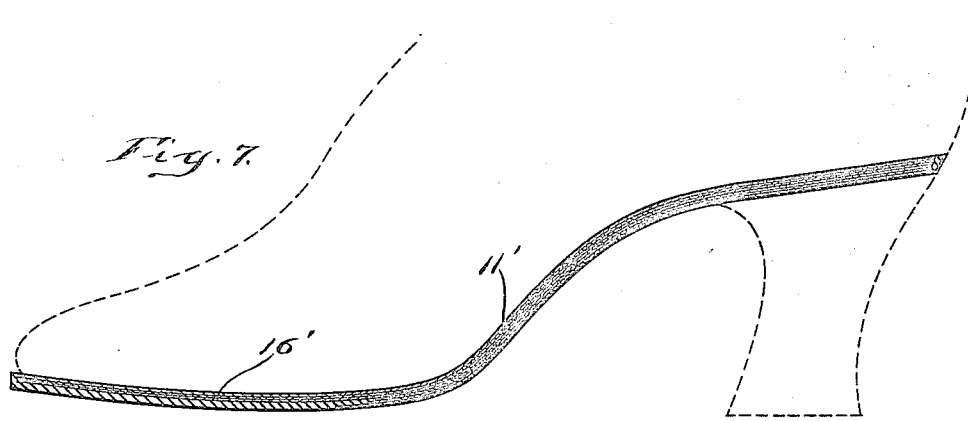

Patented Oct. 24, 1922.

1,432,961

UNITED STATES PATENT OFFICE.

MAX BROWN, OF BOSTON, MASSACHUSETTS.

MOLDED SOLE.

Application filed November 2, 1917. Serial No. 199,893.

*To all whom it may concern:*

Be it known that I, MAX BROWN, a citizen of the United States, and resident of Boston, county of Suffolk, Commonwealth of Massachusetts, have invented an Improvement in Molded Soles, of which the following description, in connection with the accompanying drawings, is a specification, like characters on the drawings representing like parts in each of the several views.

This invention relates to soles of shoes and boots molded of rubber or so-called "fiber" composition, this term as herein used being meant to include any material suitable for producing molded soles which is impregnated with rubber or rubberized so as to be vulcanizable. More particularly the invention relates to a reinforcing insertion adapted to be employed in molded soles to improve the wearing qualities thereof, facilitate the securing of the sole to the upper of the shoe, providing a reinforcing shank piece integral with the sole, and other advantages as will hereinafter appear. A serious objection that has heretofore been met in the use of such reinforcing insertions in molded soles has been a tendency of the softer rubber or fiber of the body of the sole to break away from the harder reinforcing piece along the line where these are vulcanized or otherwise united, this being particularly the case with shank piece reinforcing insertions. In accordance with my invention I provide a reinforcing insertion for molded soles preferably formed of canvas or like stout textile sheets built up as a series of superposed layers impregnated with rubber or like substance capable of vulcanization and of a character to be rendered relatively harder in the required degree as compared with the softer body of the molded sole by the process of vulcanization of the sole as a whole. While I prefer to employ canvas or like textile sheets, in a broader aspect of the invention I may employ fibrous or other material of any kind capable of being treated so that it may be vulcanized to form a reinforcing insertion or layer. In accordance with a further feature of the invention I preferably make the several layers of canvas with edges overlapping with respect to one another particularly on the shank piece portion of the insertion so that the rubber or fiber of the body of the sole is interlocked with the insertion and when vulcanized thereto is held secure in the most effective manner. The reinforcing insertion of the present invention is herein shown as employed for a heel seat with a shank piece projecting therefrom, and also as a toe edge insertion, but it will be understood that this is merely illustrative and the insertion may be employed either wholly or in part as herein shown or differently formed and arranged within the broader aspect of the invention and without departing from the essential attributes thereof. The foregoing and other objects and advantages of the invention will more fully appear from the following detailed description, and the distinctive features of novelty will be pointed out in the appended claims.

Referring to the drawings:

Fig. 5 is a bottom plan view showing a modified embodiment of invention;

Fig. 6 is a lengthwise vertical section thereof; and

Fig. 7 is a lengthwise vertical section showing a still further application of the invention.

Figure 1:
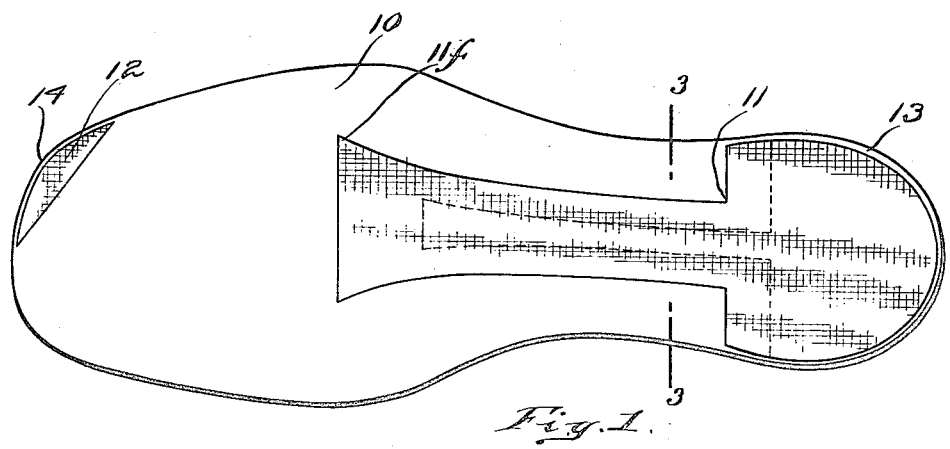
Fig. 1 is a bottom plan view showing one embodiment of the invention.
Figure 2:
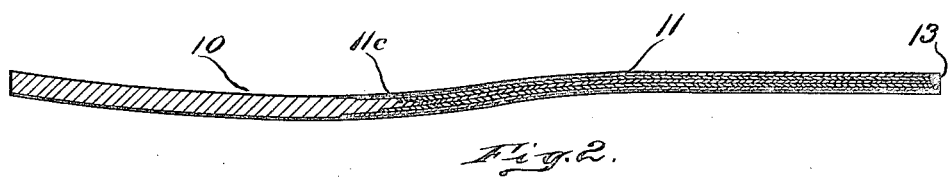
Fig. 2 is a lengthwise vertical section thereof.
Figure 3:
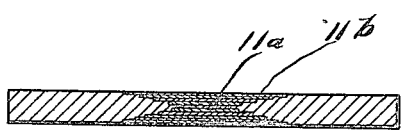
Fig. 3 is a transverse section on line 3—3 of Fig. 1 enlarged.
Figure 4:
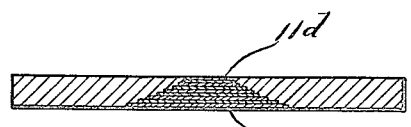
Fig. 4 is a similar transverse section showing a slightly modified form.

The body of the sole 10 is molded as usual of rubber or fiber compound preferably in a mold producing the required sole outline. The reinforcing insertion as shown in Figs. 1 and 2 consists in a combined heel seat and shank piece 11 and a separate piece 12 constituting a reinforcing wear piece for the outer toe edge. While this reinforcing insertion may be produced in different ways, it is preferably and as shown, built up of a series of superposed layers of canvas or stout cloth or like textile fiber impregnated with rubber or rubber compound adapted to be vulcanized to the sole to serve as a reinforce after the molded sole as a whole is subjected to the vulcanizing process. I preferably produce this vulcanized canvas insertion with successive layers thereof overlapping one another so as to present a largely extended area to interlock with the softer body of the fiber sole. Thus as seen in Figs. 2 and 3 the shank extension of the insertion has its center layers of canvas 11ª relatively narrow while the sucessive layers towards the surface at each side are progressively wider as seen at 11ᵇ. This formation is also preferably carried across the end of the shank piece as seen at 11ᶜ; it being understood that on account of the flexing of the sole at the instep and forward thereof, the reinforced hardened shank piece develops the greatest tendency to break away from the body of the sole along this area. As seen in Fig. 4 the same overlapping arrangement is provided with the successive layers of canvas progressively thicker from a relatively narrow tongue 11ᵈ at one side to a thickness much greater at the other side of the sole as indicated at 11ᵉ. I preferably extend the reinforcing shank piece insertion up forward of the sole toward the ball portion thereof some little farther than a separate shank piece member usually extends, such shank piece extension as seen at 11ᶠ extending up so as to reach the forward tread portion of the sole and thus by reason of the canvas face presented making a non-slip insertion that also adds to the wearing qualities of the sole. Thus by this reinforcing shank piece insertion I avoid the use of expensive and heavy shank pieces as well as providing an efficient arch support integral with the sole and at the same time provide a non-slip insertion on the tread surface at the ball of the sole. To provide and insure a smooth peripheral edge in the finished sole I preferably position the reinforcing insertions 11, 12 in the mold so as to leave a small peripheral edge of the softer molded fiber or rubber as seen at 13, 14, this being only of sufficient width to insure that a rind or continuous remnant thereof will be left after the sole is finally trimmed so as to cover the canvas edge. I preferably obtain this result by locating the canvas insertions 11, 12 in the mold by means of suitable holding pins previous to running in and molding the rubber to be vulcanized around said insertions. In the form of the invention shown in Figs. 5, 6 and 7 the reinforce insertion includes a combined shank piece and heel seat portion 11' which may be similar to that already described, but in this case a portion at least of the rubberized or rubber impregnated canvas layers are extended forward so as to include the entire ball and forward portion of the sole with only a thin peripheral rind or edge 15 of the softer body rubber or fiber to cover the edge of such insertion and present a smooth edge face for finishing. Thus as shown at 16 in Figs. 5 and 6 the two central layers of canvas are thus extended forward, these lying substantially midway of the thickness of the sole. With this provision a molded sole is produced that is capable of holding nails or like securing devices for securing the same to the shoe upper, the relatively hard layers of vulcanized canvas insertion being adapted to hold the heads of the nails and prevent them pulling or working through the sole. Further the provision of this reinforcing insertion over the forward portion of the sole prevents the edge of the sole from turning over and becoming unsightly after being worn a short time as is a common objection with former types of fiber soles. Still further the provision of this reinforcing insertion makes the ball tread of the sole more stable and a better protector of the foot, preventing the pressing of small objects such as pebbles from being transmitted through the sole to the discomfort of the wearer. The thickness of the reinforcing insertion which is thus extended forwardly of the sole may be of course gauged as required, having in mind that on the one hand the sole should preserve the requisite degree of flexibility for comfort and on the other hand be reinforced so as to present the desirable attributes and advantages already referred to. In Fig. 7 a further distinctive advantage of the present invention is illustrated, i. e., in the case of shoes particularly ladies' shoes where the arch and heel seat are raised sharply from the ball portion of the sole, this requiring a permanent set of the sole with such abrupt bend at the instep, this in the case of leather soles of course requires the sole to be distorted permanently from its normal flat condition, with a resulting tendency to revert to such flat condition and hence break down the shape of the shoe after a period of use. Likewise in the case of rubber of fiber soles molded flat or without the present shank piece reinforce, the tendency is to revert to normal shape and flatten out. In the present case on the other hand when the sole equipped with the rubberized shank piece insertion is vulcanized, this is carried out in a mold making the sole initially as vulcanized of the required shape and with any required degree of raise at the arch and heel seat, and this will be hence the normal shape of the sole in which it will be strongly and permanently held by the reinforcing shank piece insertion which tends constantly to prevent any distortion from this shape throughout the period of service of the shoe. As shown in Fig. 7 also certain layers of the reinforcing insertion are extended up forward of the sole, but as seen in 16' in this case said layers are shown as nearer the inner face than the outer face of the sole, this being preferable for sewed soles, since the canvas insertion will not be so quickly exposed. I am aware that the invention may be embodied in other specific forms without departing from the spirit or essential attributes thereof, and I therefore desire the present embodiment as to materials referred to, and otherwise, to be considered in all respects as illustrative and not restrictive, reference being had to the appended claims rather than to the foregoing description to indicate the scope of the invention.

Having described my invention, what I claim as new and desire to secure by Letters Patent is:

1. A molded sole, having an insertion built up of superposed layers of textile sheets vulcanized together, said insertion including a shank piece, said layers in said shank piece being of diverse widths for interlocking with the body of the sole.

2. A vulcanized molded sole, comprising a body of relatively soft material, and a reinforcing insertion composed of a heel seat and a shank piece extending therefrom forward to the ball of the sole to constitute a non-slip surface, said insertion consists in a series of layers of canvas vulcanized together, the several layers of said insertions presenting stepped edges for interlocking with the body of the sole.

In testimony whereof, I have signed my name to this specification.

MAX BROWN.